United States Patent [19]
King et al.

[11] 3,859,788
[45] Jan. 14, 1975

[54] COMBUSTION GAS TREATMENT

[76] Inventors: Orville D. King, 22800 Runnymeade St., Canoga Park, Calif. 91304; Joseph G. Rosales, 13513 S. Arcturus Ave., Gardena, Calif. 90249

[22] Filed: June 11, 1973

[21] Appl. No.: 368,721

[52] U.S. Cl..................... 60/280, 60/283, 60/297, 60/310
[51] Int. Cl............................... F01n 5/04
[58] Field of Search ............. 60/310, 283, 280, 297

[56] References Cited
UNITED STATES PATENTS

| | | |
|---|---|---|
| 2,612,745 | 10/1952 | Vecchio.............................. 60/297 |
| 3,013,546 | 12/1961 | Bonifield............................. 60/310 |
| 3,050,376 | 8/1962 | Bishop et al........................ 60/283 |
| 3,186,164 | 6/1965 | Dolfi................................... 60/310 |
| 3,479,799 | 11/1969 | Aoki.................................... 60/310 |
| 3,737,515 | 6/1973 | Veloso................................ 60/310 |
| 3,779,013 | 12/1973 | Faber et al.......................... 60/278 |

*Primary Examiner*—Carlton R. Croyle
*Assistant Examiner*—O. T. Sessions
*Attorney, Agent, or Firm*—William W. Haefliger

[57] ABSTRACT

Reduction of pollutants in gaseous products of combustion is achieved through a novel process of scrubbing of the gases with treating liquid, a major portion of which consists of mineral salts, such as brine.

13 Claims, 9 Drawing Figures

COMBUSTION GAS TREATMENT

BACKGROUND OF THE INVENTION

This invention relates generally to reduction of pollutants in gaseous products of combustion, and more particularly concerns a simple, inexpensive system and method for removal of such pollutants through scrubbing such gases with treating liquid, a major portion of which consists of an aqueous solution of mineral salts, such as brine.

Common pollutants found in combustion gases, as for example internal combustion engine exhaust, include carbon monoxide, sulfur oxides, oxides or nitrogen, gaseous hydrocarbons with solids or particulate matter including carbon. Past attempts to control such pollutants have involved use of catalysts and use of gas recycling techniques. In the case of catalysts, there is no assurance that all of the objectionable oxides will be removed from the engine exhaust gas stream; also, catalysts become deactivated or poisoned through use, and replacement is undesirably expensive. Recycling the exhaust gases through an engine carburetor only reduces (i.e., does not eliminate) the objectionable pollutants, and performance of the engine suffers in terms of difficult starts, engine damage and reduced mileage per volume unit of fuel used. Measures taken to reduce the emissions of one (single) pollutant may result in increased emission of another. All pollutants must be confined and treated together to break down their chemical structures to a safe and satisfactory level. It is clear that such prior techniques have not produced the required solution to combustion gas caused air pollution in urban areas.

SUMMARY OF THE INVENTION

It is a major object of the invention to provide a simple and inexpensive solution to the pollution problem, which will not reduce engine performance or decrease mileage per unit of fuel. It is another object of the invention to provide method and means to remove all major pollutants emitted in combustion gas streams in one single operational treatment to avoid unwanted chemical intermolecular action, through scrubbing of the gas stream in a highly effective manner and employing an absorbent liquid, a major portion of which consists of a solution of mineral salts such as brine.

In its apparatus respects, the invention basically comprises a chamber having an inlet for pollutant containing combustion gas and a processed or scrubbed gas outlet; first means to supply treatment liquid including brine to the chamber; other means to deliver such liquid in dispersed form into the hot gas flowing within the chamber to cool such gas and to effect intimate contacting of the delivered liquid with combustion gas in response to the gas flow through the chamber, thereby to enhance absorption of gas entrained pollutants by particles of the dispersed liquid; and collector means to collect the absorbent liquid separating from the gas within the chamber. As will be seen, the liquid dispersing means may with unusual advantage comprise rotary impeller structure in the path of combustion gas and liquid passage through the chamber to effect intimate mixing of the liquid and exhaust gas; and the collector means may comprise a series of deflegmator baffles or plates in the path of the gas and dispersed liquid flow between the impeller and the chamber outlet, the baffles containing perforations to pass the flow and also presenting surfaces to collect and separate particles of absorbent liquid from the flow.

Additional objects and advantages includes the provision of baffle plates of different metallic composition to effect coagulation of the brine containing absorbent particles; the use of ethylene glycol in the treating liquid; the provision of a storage tank for the collected liquid, and pump means to circulate such liquid the chamber to the tank for gravity separation of sludge therein, the separated treating liquid being re-delivered to the chamber; the drive of the pump means by the exhaust driven axial flow impeller or by an electric drive unit; and the provision of the apparatus on an automobile to scrub exhaust gas.

These and other objects and advantages of the invention, as well as the details of illustrative embodiments, will be more fully understood from the following description and drawings, in which:

DRAWING DESCRIPTION

DETAILED DESCRIPTION

Figure 1:
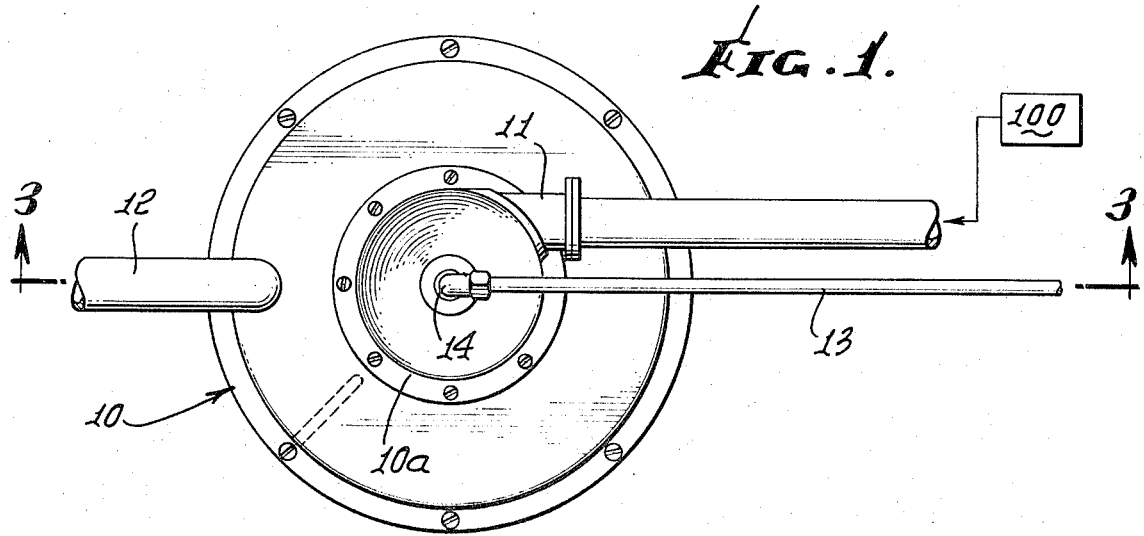
FIG. 1 is a plan view of apparatus embodying the invention.
Figure 2:
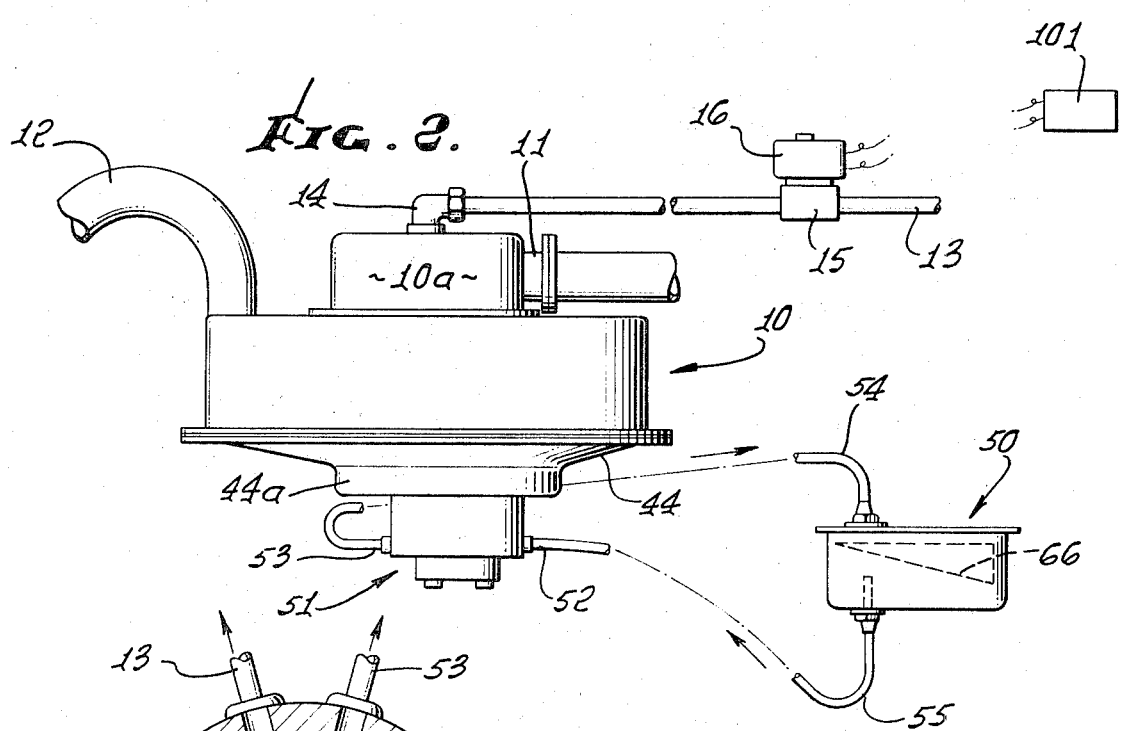
FIG. 2 is a side elevation of the FIG. 1 apparatus.

In accordance with the invention, a chamber is provided, as for example at 10 in FIGS. 1-5, to have a combustion gas inlet at 11 and a processed gas outlet 12. The source of the combustion gas may comprise an internal combustion engine represented by block 100 in FIG. 1 First means, as for example includes line 13, supplies treating liquid to a top inlet 14 to the chamber, a flow control in that line being represented by valve 15 controlled by solenoid 16. A control 101 for the solenoid, seen in FIG. 2, may be located at the instrument panel of the internal combustion engine vehicle, as for example to allow flow of liquid to inlet 14 when the ignition switch is turned on.

Such liquid includes an aqueous solution of mineral salts such as brine or sea water, (or its equivalent), and preferably refined sea water from which about 85 percent of the salt content has been removed. The liquid may also, and preferably, include ethylene glycol, the total liquid content consisting of about 75 percent mineral salts solution and about 25 percent ethylene glycol. This liquid has been found capable of removing (by absorption) substantial amounts of the main pollutants in the products of combustion of internal combustion engines, when the exhaust is treated in the manner to be described. These pollutants include carbon monoxide, sulfur oxides, oxides of nitrogen, gaseous hydrocarbon and particulate material including carbon, or other solids.

In accordance with the invention, other means communicating with the absorbent liquid supply is provided to deliver the liquid in dispersed form into the combustion gas flowing within the chamber and to effect intimate contacting of the dispersed liquid with such gas in response to such gaseous flow through the chamber, for enhancing absorption of pollutant by liquid particles. The latter contaminated particles separated form the flow are then collected, as will appear. In the example, rotary impeller structure is located in the path of combustion gas and liquid passage through the chamber 10, to effect intimate mixing of the liquid and exhaust gas. The illustrated axial flow impeller 20 has an upright axis 21 of rotation within an upper portion 10a of the chamber 10. The impeller includes blades 22 containing radial flow channels 23 communicating between an axial passage 24 in the impeller shaft 25 and outlets 26 within chamber portion 10a. Passage 24 receives liquid flow from inlet fitting 14a, and distributes such flow to an annular passage 27 between the shaft and the impeller hub 28. The latter contains ports 29 communicating between passage 27 and the radial passages 23.

The impeller blades 22 are angled in relation to combustion gas flow into chamber 10a via inlet 11 to be rotated in response to such flow across the blades. Shaft 25 serves as a means mounting the impeller to rotate about axis 21, bearings being provided at 30 and 31, and a thrust bearing at 32.

Also provided is what may be referred to as collector means to collect treating liquid and absorbed pollutant separating from the gas within the chamber. The collector means may typically and advantageously include a series of so-called deflegmator baffles or plates in the path of the gas flow between the impeller and the chamber outlet, the plates containing perforations or openings to pass the flow and also presenting surfaces to collect and separate particles of liquid and pollutant from the flow. In the example, plates 34 are located between inner and outer shells 35 and 36, they contain vertically staggered openings 37, and they present multiple surfaces 38 to the up-flow indicated by arrows 39. In this regard, the flow of mixed gas and liquid passes generally downwardly through the impeller into an open zone 40 inwardly of shell 35, the flow turning radially outwardly and then upwardly beneath plates 34 to plenum 180 and to outlet 12. Openings 41 in frustoconical shell 42 directly beneath the impeller serve to direct the flow laterally as indicated by arrows 43. The plates 34 may with unusual advantage consist essentially fo nickel and copper plates 34a and 34 b respectively, and in alternation, further enhancing absorption of the pollutants by the absorbent liquid, the latter coalescing into drops that drain onto the removable bottom pan 44 for collection in sump 44a. In this regard, the molecules of the chemically active and insoluble pollutants are scrubbed by the dilute treatment liquid, including ionized salts. Pan 44 is removably connected with the outershell at 45, for cleaning, and the upper housing extent 46 is also removable from the chamber at 47 to give access to the impeller, for cleaning.

Figure 6:
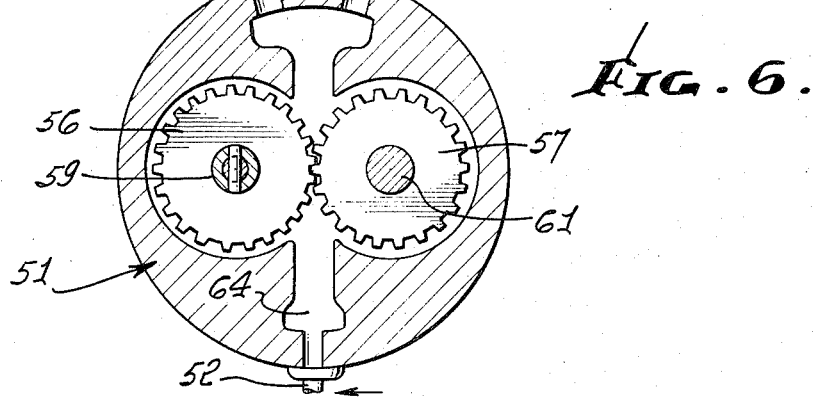
FIG. 6 is a section taken on lines 6—6 of FIG. 3.
Figure 3:
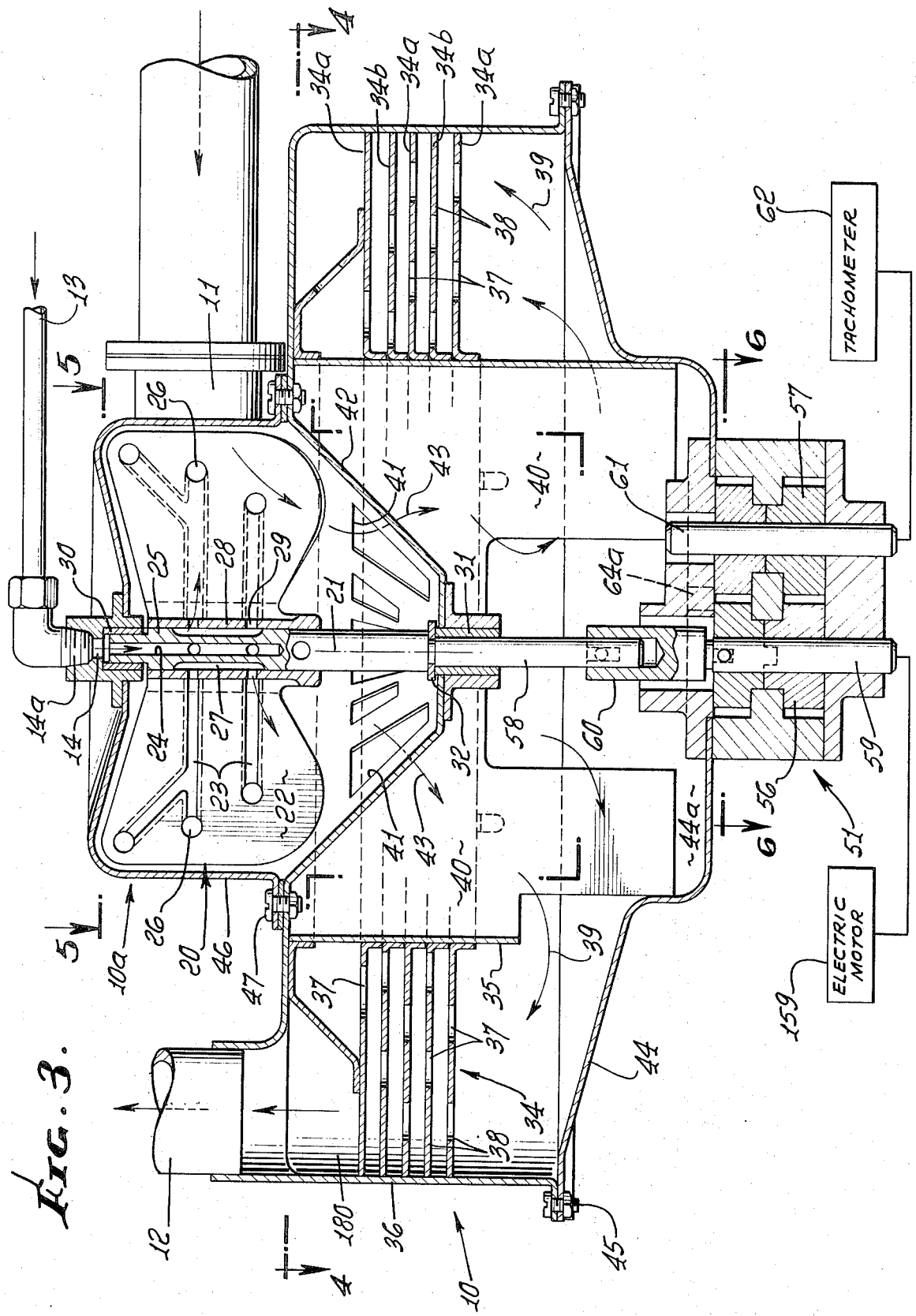
FIG. 3 is an enlarged section on lines 3—3 of FIG. 1.
Figure 4:
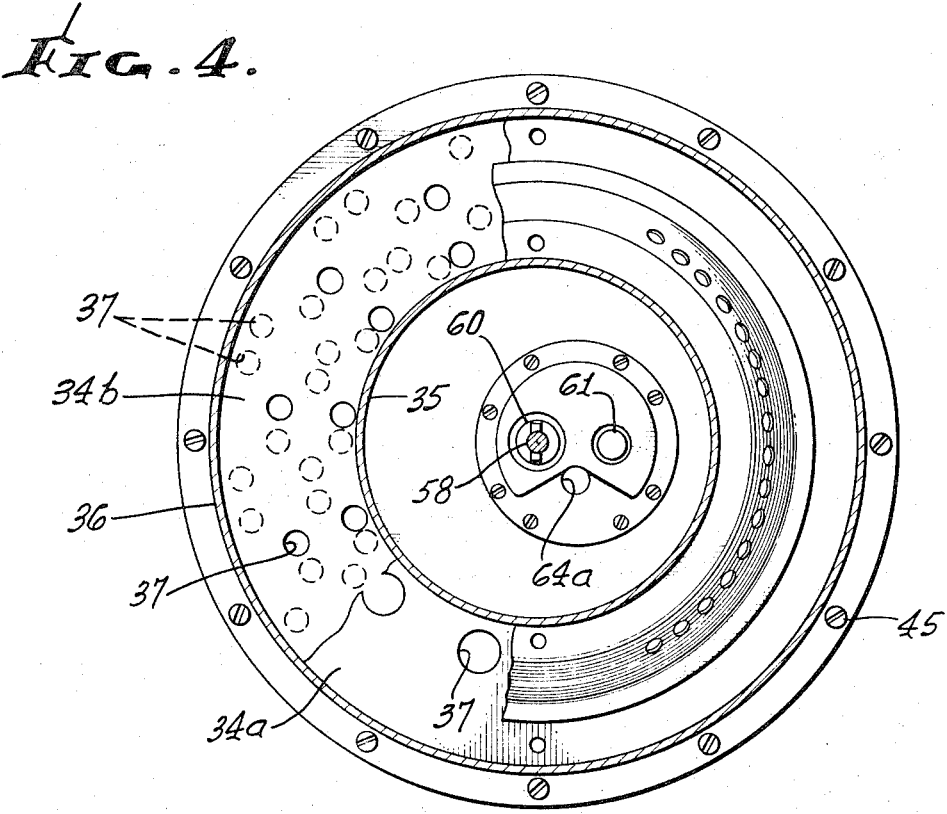
FIG. 4 is a reduced section taken on lines 4—4 of FIG. 3.
Figure 5:
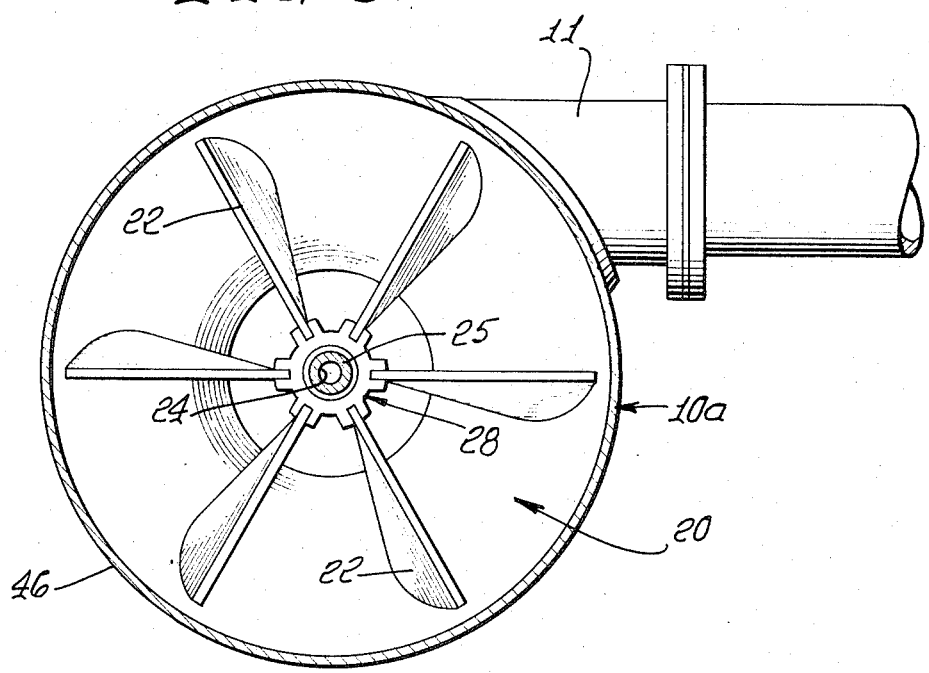
FIG. 5 is a reduced section taken on lines 5—5 of FIG. 3.

The means to supply treating liquid may include the storage tank 50 together with means to circulate the collected liquid in sump 44a to that tank. The circulating means may for example include a rotary gear pump 51 having intake and discharge sides 52 and 53, a first line 54 extending from the discharge side to the tank, and a second line 55 extending from the tank to the intake 52. Pump 51 may include rotary gears 56 and 57, the former connected as by a shafts 58 and 59 with the impeller shaft, to be driven by the impeller and electric motor 159. A coupling 60 interconnects shafts 58 and 59. Gear 57 is carried by shaft 61 and is driven by gear 56. A tachometer 62 may be connected with shaft 61, if desired. Supply line 13 is connected with the pump discharge 53, and the sump 44a may be connected with the intake side 64 the gears, as seen in FIG. 6, via inlet 64a. Pollutant in holding tank 50 tends to coagulate and form sludge collecting at the tank bottom. A spill tray 66 directs the entering liquid to one side of tank 50, which is replaceable upon saturation with a new charge of mineral salts solution as described.

Figure 9:
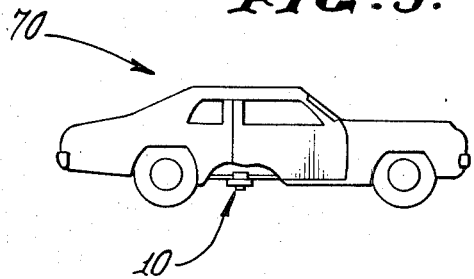
FIG. 9 shows application of the invention to an automobile exhaust.

FIG. 9 shows the apparatus of FIGS. 1-6 carried by an internal combustion engine powered vehicle 70.

Figure 7:
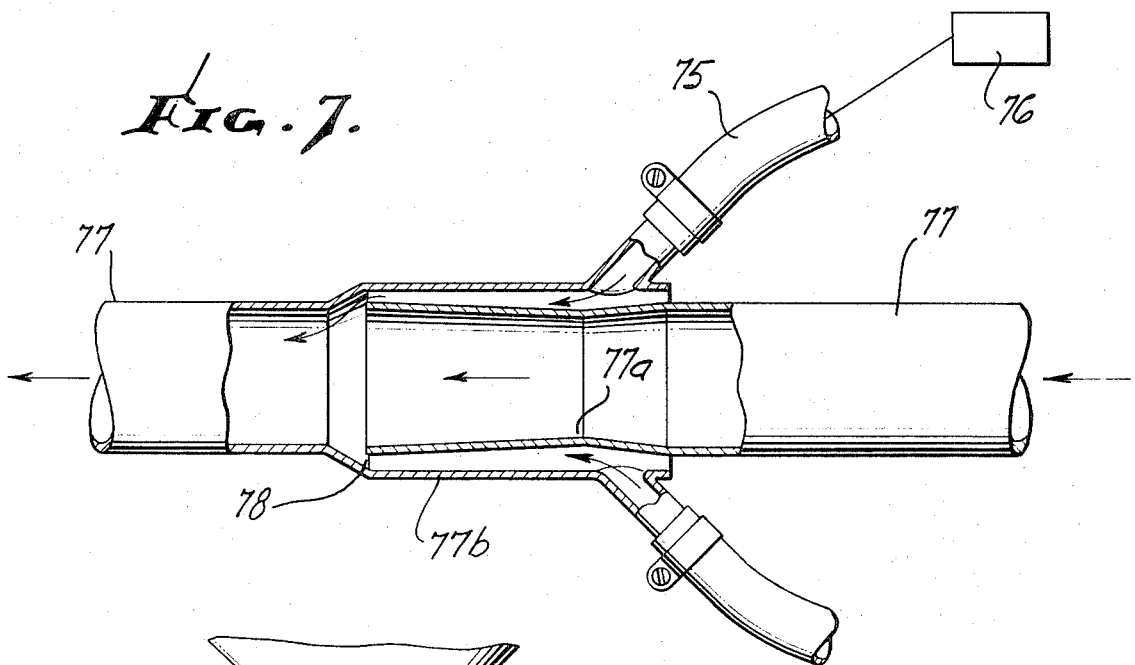
FIG. 7 is a section through a gas mixing device usable with the gas feed in FIGS. 1-3.

FIG. 7 shows duct means 75 communicating between the internal combustion engine crank case 76 and the engine exhaust line 77, the latter extending to chamber inlet 11. In this regard, line 77 may include a venturi section 77a loosely telescopically received into a tube 77b to which scavenge gas is supplied via duct 75. Clearance 78 between the end of section 77a and the tube 77b passes scavenge gas into line 77 downstream of the venturi section and leading to inlet 11.

Figure 8:
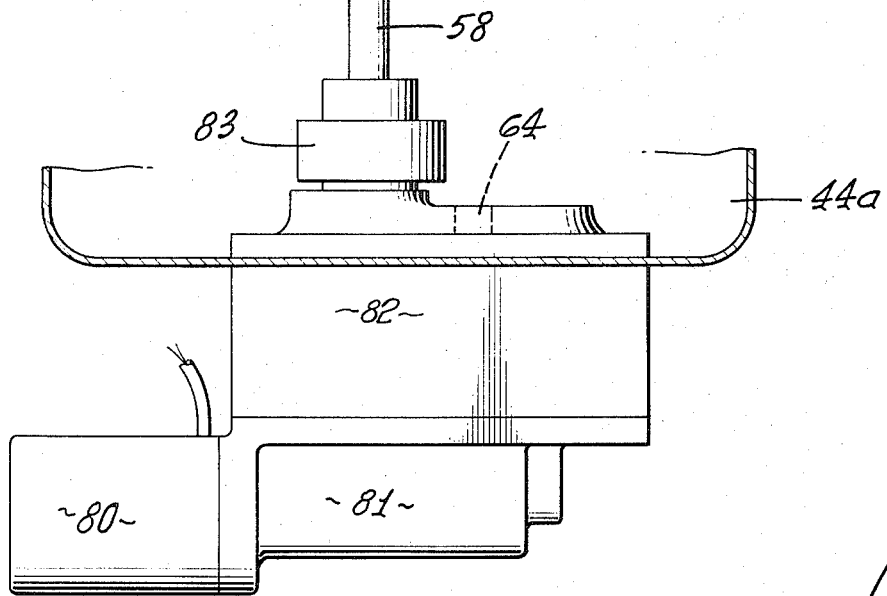
FIG. 8 is an elevation showing an electric motor drive.

FIG. 8 shows the provision of a drive including an electric motor 80 and a gear box 81 connected with the pump gear 51 previously described and located within housing 82. Such a drive assures immediate vapor mist spray production in the mixing or processing housing, through initial high speed rotation of the impeller structure. An overrunning clutch 83 is connected between the pump gear shaft 59 and shaft 58 to decouple the motor and drive from the impeller in response to predetermined high speed of the engine so that the motor is not driven in rotation by the impeller.

If desired, the chamber 36 may be made in different configurations, including a flattened, rectangular shape to better fit beneath the floor of a motor vehicle, replacing the conventional muffler system for abating sound, as well.

We claim:
1. Combustion gas treatment apparatus comprising
   a. a chamber having a combustion gas inlet and a processed gas outlet, the inlet gas containing pollutant,
   b. first means to supply to the chamber treatment liquid including an aqueous solution of mineral salts,
   c. other means communicating with said supply means to deliver the liquid in dispersed form into the gas flowing within the chamber and to effect intimate contacting of the delivered liquid with combustion gas in response to said gas flow through the chamber, for enhancing absorption of gas entrained pollutants by particles of the dispersed liquid, said other means including rotary impeller structure rotatable in the path of combustion gas and liquid passage through the chamber to effect intimate mixing of the liquid and exhaust gas, said impeller structure containing flow channels to receive and initially disperse the liquid into the flowing combustion gas in the chamber as the impeller rotates,
   d. and collector means to collect treating liquid and absorbed pollutant separating from the gas within the chamber, said collector means including a series of deflegmator baffles in the path of the combustion gas dispersed liquid flow between the im- peller and said outlet, said baffles containing staggered perforations to pass the flow and also presenting surfaces to collect and separate particels of treating liquid and pollutant from the flow, the chamber containing an open flow path which changes direction between the impeller structure and the baffles and from which liquid may gravitate away from the baffles.

2. The apparatus of claim 1 wherein the impeller structure includes blades angled in relation to the combustion gas flow in the chamber to be rotated in response to said flow across the blades, and means mounting the impeller to rotate.

3. The apparatus of claim 1 wherein said impeller apparatus has a vertical axis of rotation, the flow passing downwardly through the impeller, said flow path extending beneath the impeller and radially outwardly and then upwardly toward the baffles which are located in the path of the upwardly directed flow, there being inner and outer chamber shells between which the baffles are confined.

4. The apparatus of claim 3 wherein the baffles comprise metal plates, alternate plates consisting essentially of nickel and copper.

5. The apparatus of claim 3 wherein said first means includes a storage tank for collected liquid, and means to circulate collected liquid from said chamber to said storage tank for collection of sludge therein.

6. The apparatus of claim 5 wherein said circulating means comprises a rotary pump having rotary connection with said impeller means.

7. The apparatus of claim 6 wherein said pump comprises a gear pump having intake and discharge sides, said circulation means including a first line extending from said discharge side to said tank and a second line extending from said tank to said intake side.

8. The apparatus of claim 3 wherein said liquid also includes ethylene glycol.

9. The apparatus of claim 8 wherein the liquid consists of about 75 percent mineral salts solution and about 25 percent ethylene glycol.

10. The apparatus of claim 1 wherein the chamber inlet is connected with an internal combustion engine exhaust line.

11. The apparatus of claim 10 wherein the apparatus of claim 1 is carried by an internal combustion engine powered vehicle.

12. The apparatus of claim 10 including duct means communicating between the engine crank case and said line to scavenge fumes in the crank case in response to flow of engine exhaust gases to said inlet.

13. Combustion gas treatment apparatus comprising a. a chamber having a combustion gas inlet connected with an internal combustion engine exhaust line, and a processed gas outlet, the inlet gas containing pollutant, b. first means to supply to the chamber treatment liquid including an aqueous solution of mineral salts, c. other means including a rotary impeller communicating with said supply means to deliver the liquid in dispersed form into the gas flowing within the chamber and to effect intimate contacting of the delivered liquid with combustion gas in response to said gas flow through the chamber, for enhancing absorbtion of gas entrained pollutants by particles of the dispersed liquid, d. and collector means to collect treating liquid and absorbed pollutant separating from the gas within the chamber in the form of collected liquid, e. there being a drive including an electrical motor connected with the impeller and with a pump to circulate said collected liquid to a storage tank, the drive including a clutch adapted to decouple the motor from the impeller in response to predetermined high speed of the engine.

* * * * *